United States Patent
Sheu et al.

(10) Patent No.: US 11,996,744 B2
(45) Date of Patent: May 28, 2024

(54) VEHICLE MOTOR STATOR STRUCTURE

(71) Applicant: DELTA ELECTRONICS, INC., Taoyuan (TW)

(72) Inventors: Hong-Cheng Sheu, Taoyuan (TW); Hsin-Yi Huang, Taoyuan (TW); Kuei-Yuan Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 392 days.

(21) Appl. No.: 17/457,262

(22) Filed: Dec. 2, 2021

(65) Prior Publication Data
US 2023/0058335 A1 Feb. 23, 2023

(30) Foreign Application Priority Data
Aug. 20, 2021 (CN) .......................... 202110960373.3

(51) Int. Cl.
*H02K 15/04* (2006.01)
*B60L 50/51* (2019.01)
(Continued)

(52) U.S. Cl.
CPC ............ *H02K 15/045* (2013.01); *B60L 50/51* (2019.02); *H02K 1/148* (2013.01); *H02K 1/165* (2013.01); *H02K 3/28* (2013.01); *H02K 15/02* (2013.01)

(58) Field of Classification Search
CPC ...... H02K 15/045; H02K 1/148; H02K 1/165; H02K 3/28; H02K 15/02; H02K 3/18;
(Continued)

(56) References Cited

U.S. PATENT DOCUMENTS 8,497,615 B2 * 7/2013 Kimura .................... H02K 3/28
                                                        310/179
9,379,585 B2    6/2016 Marvin et al.
(Continued)

FOREIGN PATENT DOCUMENTS

CN          112467896 A       3/2021
JP          4254152 B2    *   4/2009
JP          5619046 B2        11/2014

OTHER PUBLICATIONS

CN 112467896 (Year: 2021).*
EP 2688183 (Year: 2014).*
JP 2005102477 (Year: 2005).*

*Primary Examiner* — Ahmed Elnakib
(74) *Attorney, Agent, or Firm* — CKC & Partners Co., LLC

(57) ABSTRACT

A stator structure of a vehicle motor includes a stator core assembly and a plurality of coil assemblies composed of flat wires. The stator core assembly includes an annular portion and a plurality of tooth portions. The tooth portions extend from the annular portion in a radial direction toward a center of the stator core assembly. Each coil assembly is configured around a corresponding tooth portion. Each coil assembly includes a first flat wire and a plurality of second flat wires that are electrically connected in parallel. The first flat wire is radially stacked and wound around the corresponding tooth portion. The second flat wires are arranged radially adjacent to the first flat wire and are electrically connected in series to the first flat wire. The second flat wires are alternately stacked and radially wound around the corresponding tooth portion.

20 Claims, 6 Drawing Sheets

(51) Int. Cl.
*H02K 1/14* (2006.01)
*H02K 1/16* (2006.01)
*H02K 3/28* (2006.01)
*H02K 15/02* (2006.01)

(58) Field of Classification Search
CPC .............. H02K 3/522; H02K 2203/09; H02K 2213/03; B60L 50/51; B60L 2220/50
USPC ........................................................ 310/179
See application file for complete search history.

(56) References Cited

U.S. PATENT DOCUMENTS

| | | | |
|---|---|---|---|
| 9,806,573 B2 * | 10/2017 | Kato | ................... H02K 3/18 |
| 2004/0263015 A1 * | 12/2004 | Okada | ................ H02K 3/522 |
| | | | 310/194 |
| 2018/0152070 A1 * | 5/2018 | Sheu | ................... H02K 3/12 |
| 2023/0058335 A1 * | 2/2023 | Sheu | ................... H02K 1/165 |

* cited by examiner

VEHICLE MOTOR STATOR STRUCTURE

CROSS-REFERENCE TO RELATED APPLICATION

This application claims priority to China Application Serial Number 202110960373.3, filed Aug. 20, 2021 which is herein incorporated by reference in its entirety.

BACKGROUND

Field of Disclosure

The present disclosure relates to a stator structure, and particularly to a stator structure of a vehicle motor.

Description of Related Art

In conventional vehicle motors, if round cross-sectional wires are used for stacking and winding around the teeth of the iron core, it often takes longer time to enhance coil space factor as much as possible in the winding groove space between adjacent teeth, and the coil space factor of the wires after multi-turn stacked winding is still not ideal. In view of this, motor manufacturers are actively looking for solutions that can increase the coil space factor after winding and more effectively improve the performance of the motor.

SUMMARY

The present disclosure provides a vehicle motor stator structure to deal with the needs of the prior art problems.

In one or more embodiments, a vehicle motor stator structure includes a stator core assembly and a plurality of coil assemblies composed of flat wires. The stator core assembly includes an annular portion and a plurality of tooth portions. The tooth portions extend from the annular portion in a radial direction toward a center of the stator core assembly. Each coil assembly is configured around a corresponding tooth portion. Each coil assembly includes a first flat wire and a plurality of second flat wires that are electrically connected in parallel to each other. The first flat wire is radially stacked and wound around the corresponding tooth portion. The second flat wires are arranged radially adjacent to the first flat wire and are electrically connected in series to the first flat wire. The second flat wires are alternately stacked and radially wound around the corresponding tooth portion.

In one or more embodiments, a vehicle motor stator structure includes a stator core assembly and a plurality of coil assemblies composed of flat wires. The stator core assembly includes an annular portion and a plurality of tooth portions. The tooth portions extend from the annular portion in a radial direction toward a center of the stator core assembly. Each coil assembly is configured around a corresponding tooth portion. Each coil assembly includes a first flat wire and a plurality of second flat wires that are electrically connected in parallel to each other. The first flat wire is radially stacked and wound around the corresponding tooth portion. The second flat wires are radially wound around the corresponding tooth portion of the tooth portions, and arranged radially adjacent to the first flat wire and electrically connected in series to the first flat wire. A cross-sectional radial thickness sum of each set of the second flat wires is greater than a cross-sectional radial thickness of the first flat wire, and a cross-sectional radial thickness stacked sum of all the second flat wires stacked and wound around the corresponding tooth portion is smaller than a cross-sectional radial thickness stacked sum of the first flat wire stacked and wound around the corresponding tooth portion.

In sum, the stator structure of the vehicle motor disclosed herein has two types of flat wires have different cross-sectional thicknesses and widths and adjacent to each other in the radial direction to form a step profile, thereby enhancing coil space factor. The two types of flat wires include a first flat wire electrically connected in series to a plurality of second flat wires electrically connected in parallel to each other. The second flat wires are stacked radially adjacent to the first flat wire, and radially alternately stacked and wound around the tooth portion. The cross-sectional radial thickness sum of each pair or set of the second flat wires is greater than the cross-sectional radial thickness of the first flat wire, and the cross-sectional radial thickness sum of all the second flat wires stacked around the tooth portion is smaller than the cross-sectional radial thickness sum of the first flat wire stacked around the tooth portion. With the above-mentioned two types of flat wires, the coil space factor of the conductors can be enhanced, the stator operation loss can be reduced, and the operation efficiency of the vehicle motor stator structure can be improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
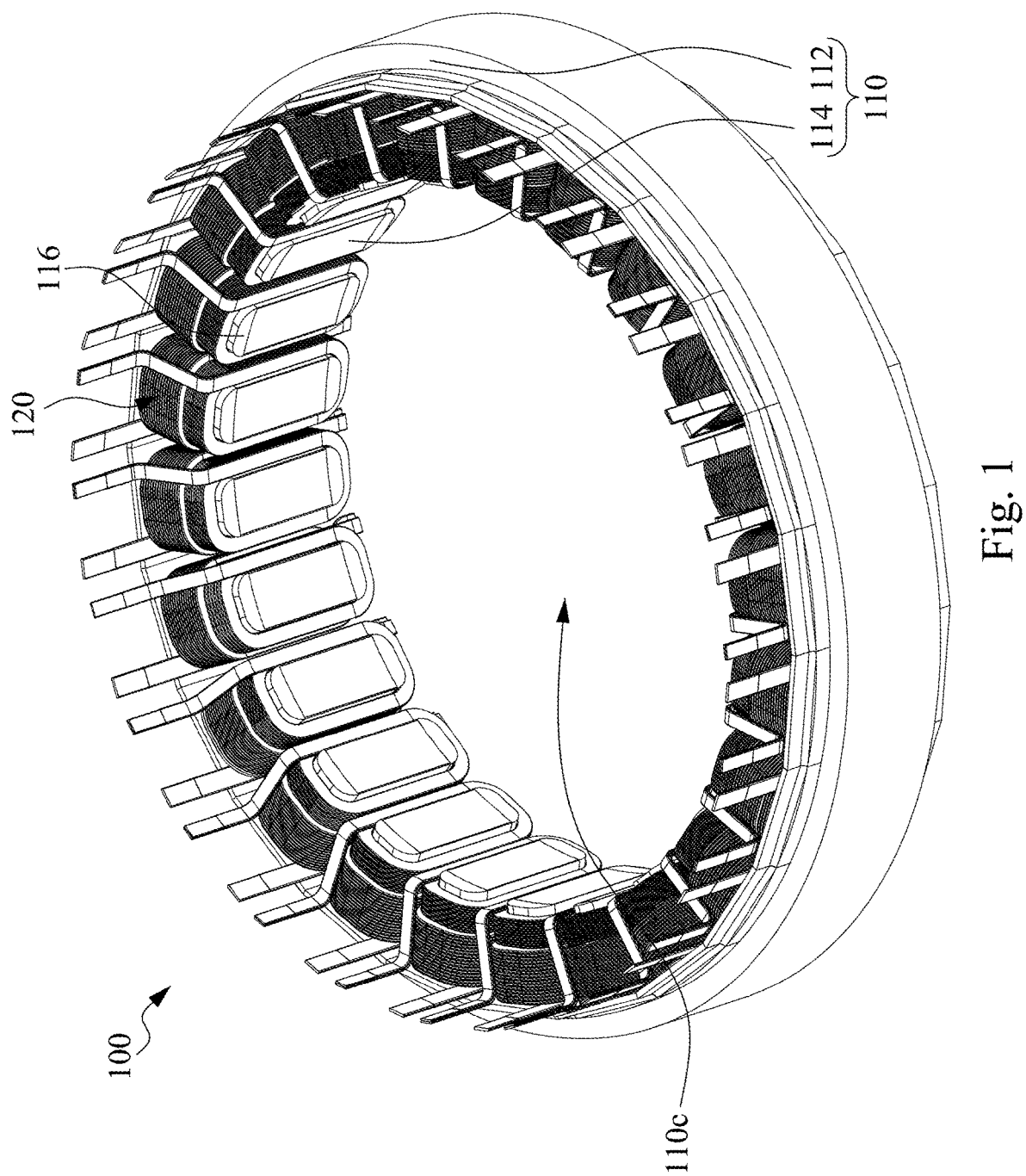
FIG. 1 illustrates a perspective view of a vehicle motor stator structure according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, a stator structure 100 includes a stator core assembly 110. The stator core assembly 110 includes an annular portion 112 and a plurality of tooth portions 114, and the tooth portions 114 extend from the annular portion 112 toward a center 110c of the stator core assembly 110 in a radial direction. An insulating winding frame 116 is sheathed around each tooth portion 114 such that a coil wire can be properly insulated from the stator core assembly 110 after winding. The stator structure 100 includes a plurality of coil assemblies 120 composed of flat wires, and each coil assembly 120 is configured on a corresponding tooth portion 114. In the manufacturing process, the coil assemblies 120 composed of flat wires are wound around the tooth portion 114 to quickly stack the wires on each tooth portion 114 in a radial direction, and reduce working-hours for winding. The coil assemblies 120 composed of flat wires also help to increase an operating power of the vehicle motor stator.

Figure 2:
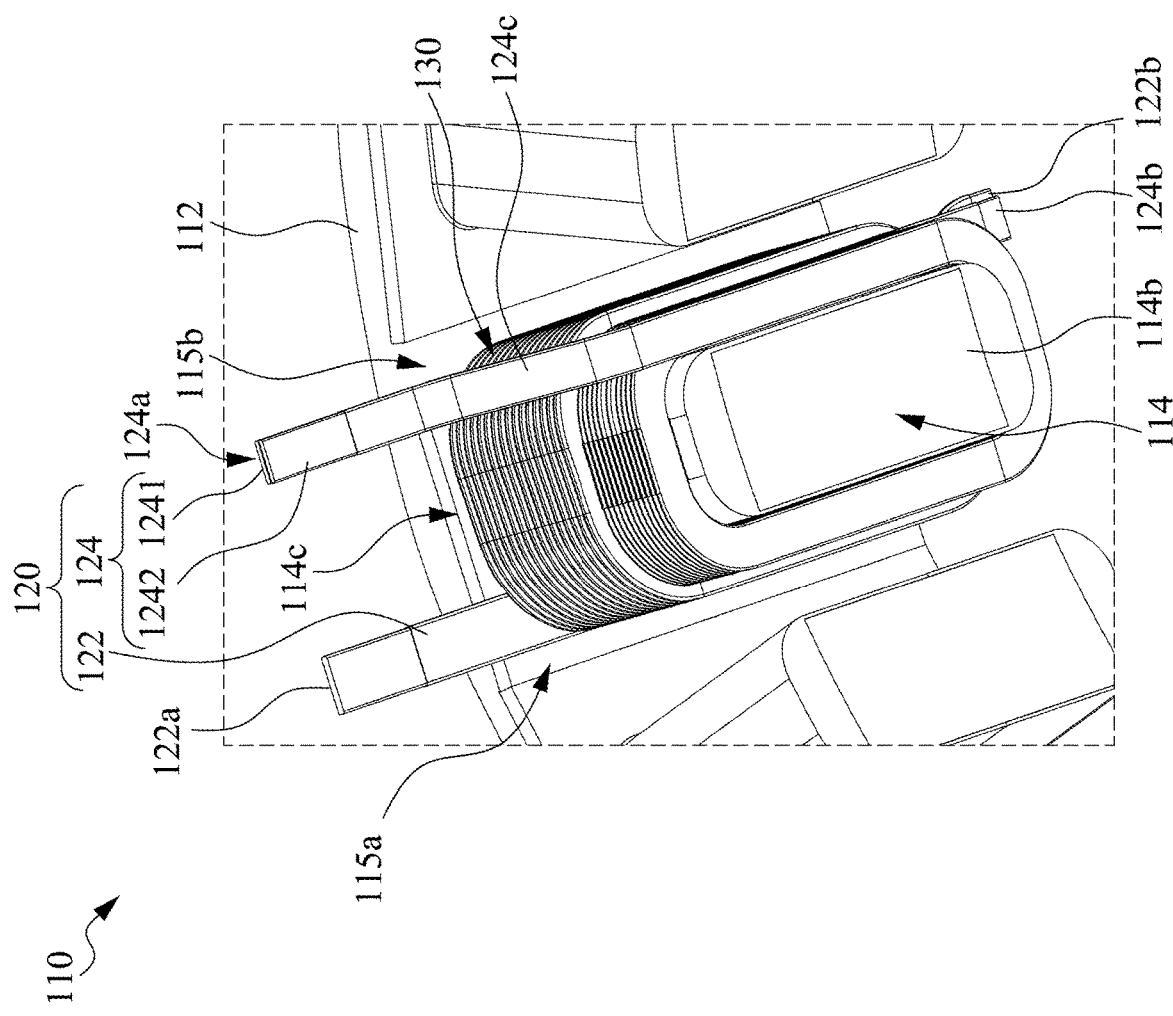
FIG. 2 illustrates a perspective view of a tooth portion configured with coil assemblies in a stator structure according to one embodiment of the present disclosure.

Reference is made to FIG. 2, each coil assembly includes a first flat wire 122 and a plurality of second flat wires 124 electrically connected in parallel to each other. The first flat wire 122 is radially stacked and wound around the tooth portion 114 from the root portion 114c of the tooth portion 114. The second flat wires 124 are radially adjacent to the first flat wire 122 and are electrically connected to the first flat wire 122 in series. In an embodiment of the present invention, each coil assembly 120 includes a first flat wire 122 and two electrically connected second flat wires 124, and the two electrically connected second flat wires (1241, 1242) are radially alternately stacked around the tooth portion 114 (referring also to FIG. 3, the two second flat wires 1241 and 1242 are presented by different gray patterns). In other examples of the present invention, each coil assembly 120 may include three or more second flat wires 124 electrically connected in parallel to each other. The stacked winding of the second flat wires 124 are farther from the annular portion 112 than the stacked winding of the first flat wire 122. The electrical configuration of the first flat wire 122 and second flat wires 124 mentioned above helps to reduce the power loss during the operation of the stator structure 100. Since the first flat wire 122 and second flat wires 124 have the same conductor cross-sectional area, using different conductor cross-sectional sizes can further enhance coil space factor of the conductor and effectively reduce the DC copper wire loss. In addition, the first flat wires 122 are connected in series with the second flat wires 124, and the second flat wires 124 are divided into wires 1241, 1242 to reduce the cross-sectional area of each single conductor of the copper wire close to the head 114b of the tooth portion such that the cross-sectional area of a single conductor can be reduced to effectively reduce the AC copper loss in a region of high magnetic field density.

The first flat wire 122 includes a first end 122a and a second end 122b, and each of the second flat wires 124 includes a first end 124a and a second end 124b that are electrically connected in parallel. In an embodiment of the present invention, the first end 122a of the first flat wire 122 and the first ends 124a of the second flat wires 124 protruding from the stator core assembly 110 are adjacent to the annular portion 112, which is beneficial to free up more space to configure annular connection structures (such as the annular connection structures 150 in FIG. 6). In addition, the flat wire protrudes out of the stator core assembly 110 at a position that is adjacent to the annular portion 112 and away from the center 110c of the iron core where a motor rotor is arranged, which can reduce the inconvenience in the manufacturing process and the hindrance when the motor rotates. In one embodiment of the present disclosure, each of the second flat wires 124 includes an extension portion 124c extending from the head 114b of the tooth portion 114 to the first end 124a of the second flat wires 124 to guide the second flat wires 124 to protrude out close to the annular portion 112. The extension portion 124c is arranged axially adjacent to the stacked wires, which can avoid occupying the groove space between the tooth portions. The extension portion 124c in FIG. 2 is arranged at an arc-shaped bent portion 130 adjacent to the stacked wires, which is beneficial to reduce or avoid an axial length that the extension portion 124c may need add to the status core assembly 110 when the extension portion 124c is configured. In one embodiment of the present disclosure, the first end 122a of the first flat wire 122 protrudes from the first side 115a of the tooth portion 114, and each of the first end 124a of the second flat wires 124 protrudes from the second side 115b of the tooth portion 114, The second side 115b and the first side 115a of the tooth portion 114 are opposite to each other. This configuration facilitates the spacing between the first end 122a of the first flat wire 122 and the first ends 124a of the second flat wires 124 to connect a phase terminal or a neutral terminal respectively and avoid mutual interference. In one embodiment of the present disclosure, the second end 122b of the first flat wire 122 and the second ends 124b of the second flat wires 124 are connected to each other to form a joint (e.g., welding to form a joint) such that the first flat wire 122 and the parallel connected second flat wires 124 are connected in series.

Figure 3:
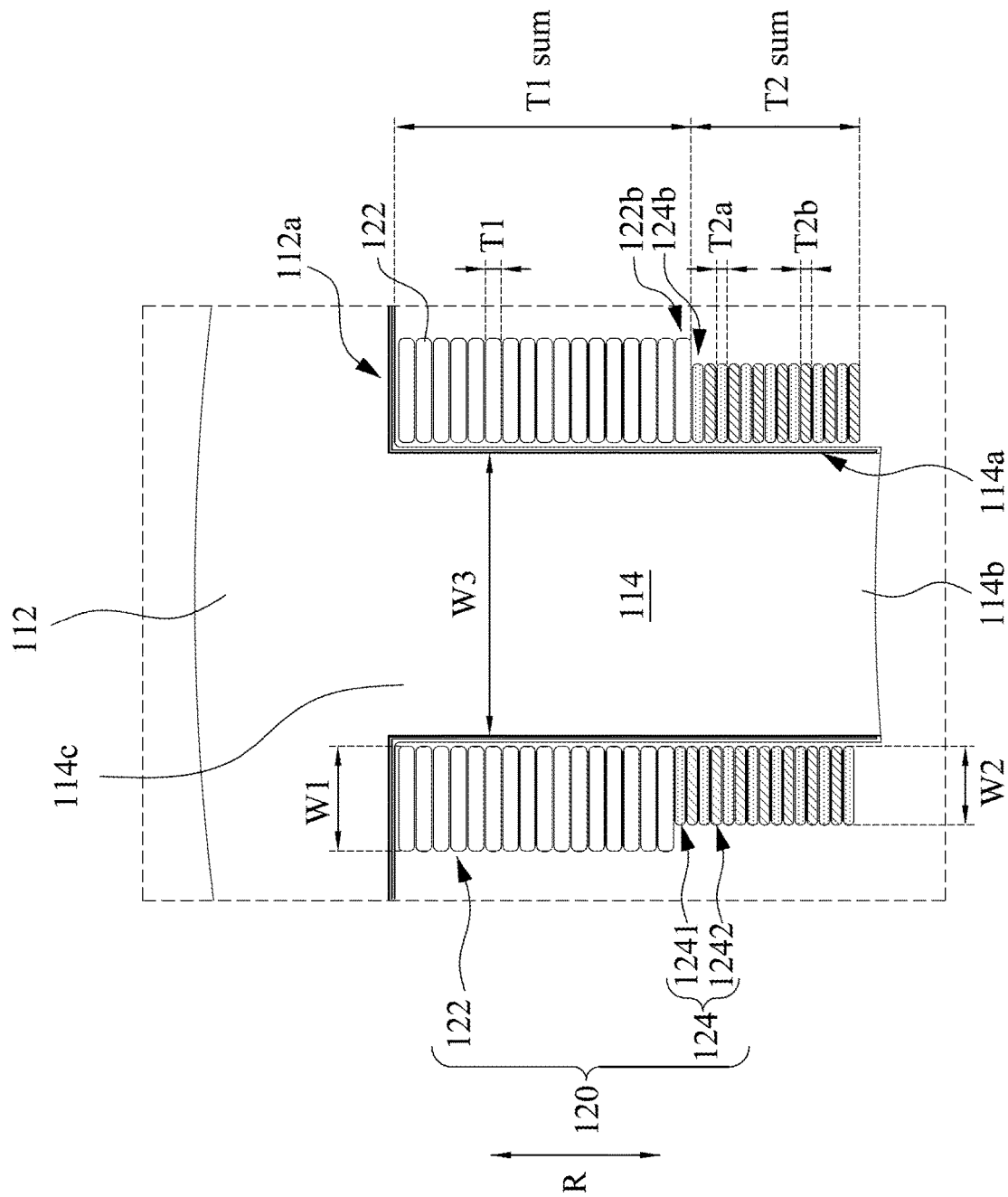
FIG. 3 illustrates a cross-sectional view of a tooth portion configured with coil assemblies in a stator structure according to one embodiment of the present disclosure.

Reference is made to FIG. 3, in one embodiment of the present disclosure, each coil assembly includes a first flat wire 122 and two second flat wires (1241, 1242) connected in parallel. The first flat wire 122 and second flat wires 124 have different cross-sectional thicknesses, widths, and diameters to form a step profile in a radial direction R, thereby enhancing coil space factor and increasing the operating power of the stator structure 100. In one embodiment of the present disclosure, the cross-sectional area sum of two second flat wires 124 connected in parallel (i.e., two flat wires (1241, 1242) with different gray patterns in the figure) is equal to or substantially equal to the first cross-sectional area of a single flat wire 122, which can reduce AC power consumption. In an embodiment of the present invention, a cross-sectional width W1 of a single first flat wire 122 is greater than a cross-sectional width W2 of each second flat wire 124 so as to form a step profile. The aforementioned cross-sectional width W1/W2 is the width in a direction perpendicular to the radial direction R.

In an embodiment of the present invention, a cross-sectional radial thickness sum of the second flat wires 124 of each pair or set (i.e., a cross-sectional radial thickness T2a of the wire 1241+a radial cross-sectional thickness T2b of the wire 1242) is greater than a cross-sectional radial thickness (T1) of a single first flat wire 122, and a cross-sectional radial thicknesses stacked sum of all the second flat wires 124 stacked and wound around the tooth portion 114 (i.e., T2 sum in the radial direction R) is smaller than a cross-sectional radial thickness stacked sum of the first flat wire 122 stacked and wound around the tooth portion 114 (i.e., T1 sum in the radial direction R), thereby enhancing the coil space factor.

In an embodiment of the present invention, a cross-sectional width W3 (a width in a direction perpendicular to the radial direction R) of a tooth portion 114 is uniform and equal from the root 114c to the head 114b. In an embodiment of the present invention, the tooth portion 114 includes a side surface 114a that is perpendicularly connected to or is nearly perpendicularly connected to an inner surface 112a of the annular portion 112 at the root portion 114c of the each tooth portion 114 to be paired with the first flat wire 122 and the second flat wires 124 of approximately rectangular cross-sections. In an embodiment of the present invention, the second flat wires 124 have cross-sectional areas that are equal to or substantially equal to each other (e.g., the respective cross-sectional areas of the second flat wires 1241 and 1242 are equal to or substantially equal to each other), so as to maintain approximately equal current density in each second flat wire 124. In other embodiments of the present invention, the cross-sectional areas of the second flat wires 124 are different form each other, e.g., two second flat wires 1241 and 1242 have their respective cross-sectional areas in an integer ratio relationship to each other or in nearly an integer ratio relationship to each other.

Figure 4:
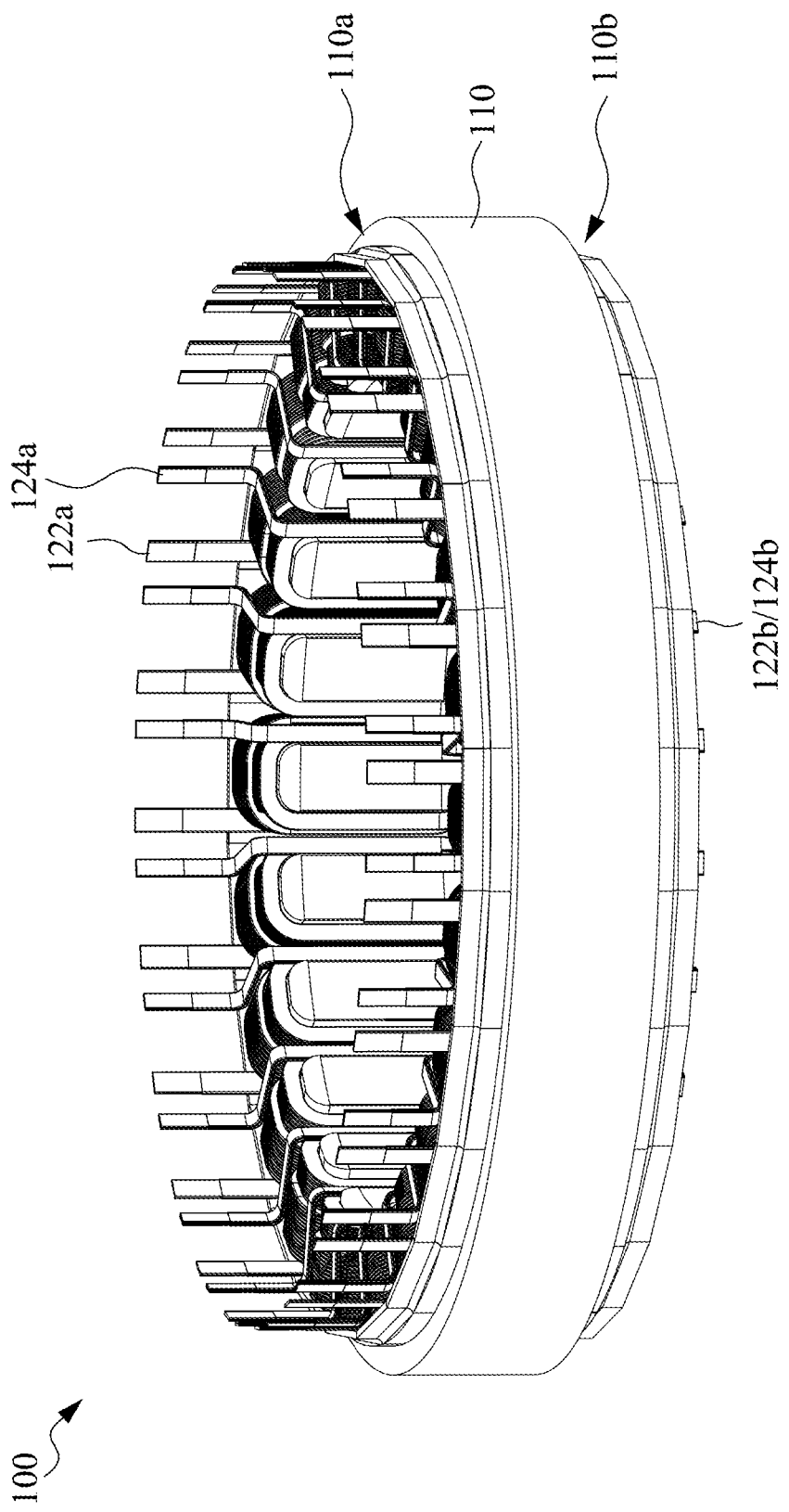
FIG. 4 illustrates a side view of a vehicle motor stator structure according to one embodiment of the present disclosure.

Reference is made to FIG. 4, the stator core assembly 110 has a first side 110a and a second side 110b that are opposite to each other. The first end 122a of the first flat wire 122 and the first ends 124a of the second flat wires 124 protrude from the first side 110a of the stator core assembly 110 respectively. The second end 122b of the first flat wire 122 and the second ends 124b of the second flat wires 124 are connected to form a joint located on the second side 110b of the stator core assembly 110, which is conducive to join the second end 122b of the first flat wire 122 and the second ends 124b of the second flat wires 124 by welding. The first end (122a, 124a) and second ends (122b, 124b) of the flat wires are respectively arranged on two opposite sides 110a, 110b of the stator core assembly 110, which is beneficial to arrange of the winding electrodes of the stator structure 100. For example, the first end 122a of the first flat wire 122 is connected to a phase terminal, and the first ends 124a of the second flat wires 124 are connected to the neutral terminal; or the first end 122a of the first flat wire 122 is connected to the neutral terminal, and the first ends 124a of the second flat wires 124 are connected to the phase terminal.

Figure 5:
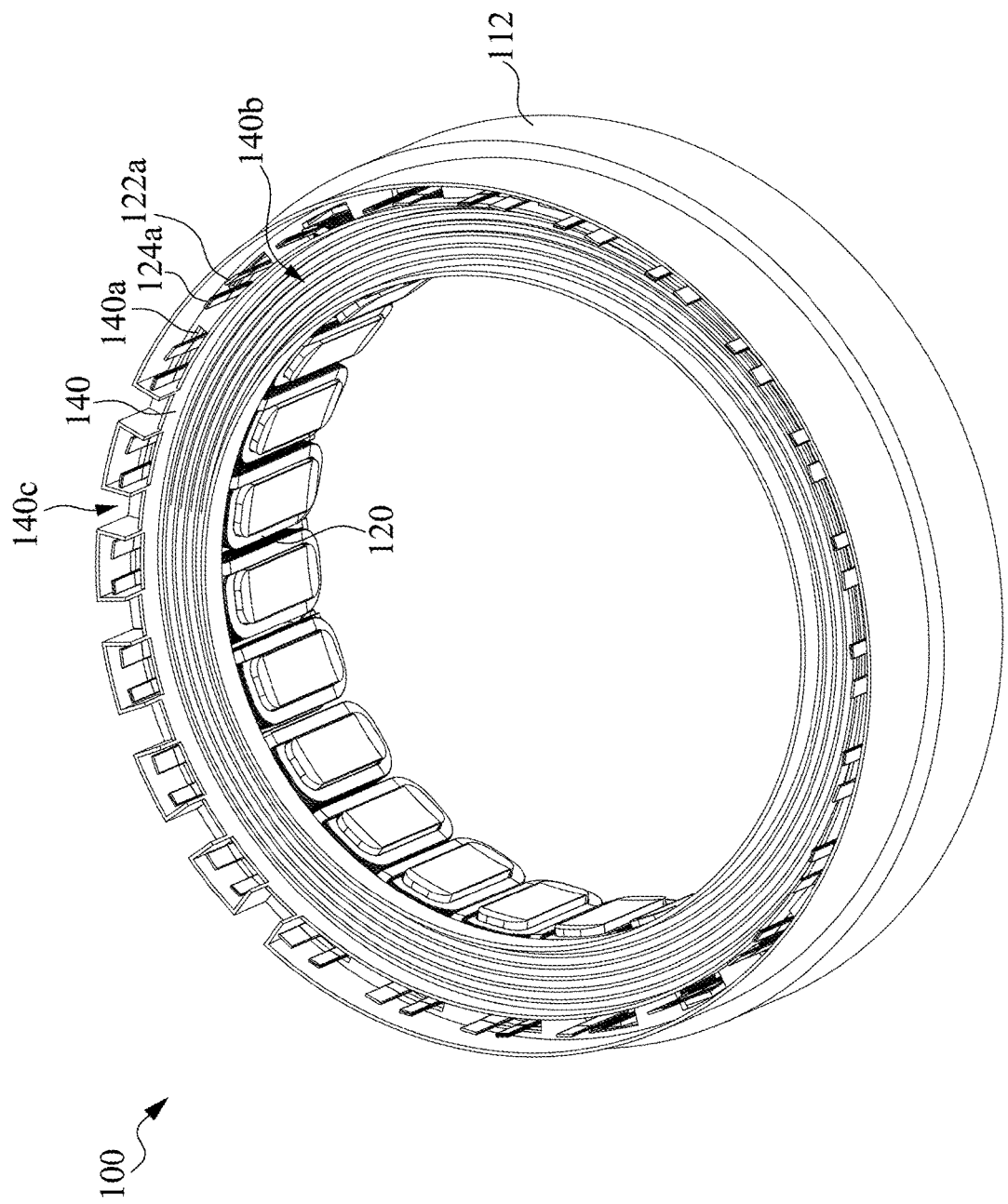
FIG. 5 illustrates a perspective view of the stator structure in FIG. 1 added with an insulating annular cover.
Figure 6:
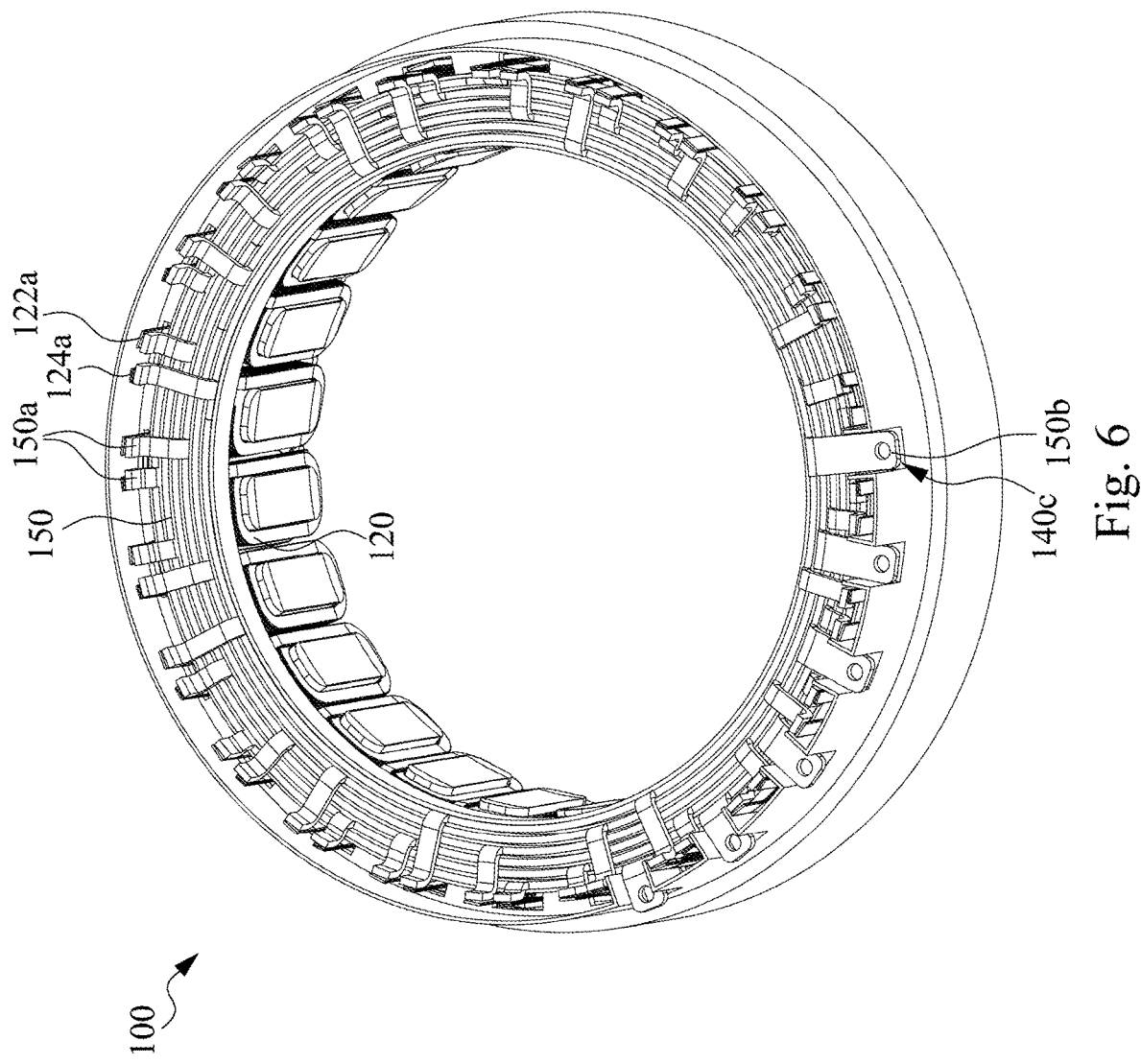
FIG. 6 illustrates a perspective view of the stator structure in FIG. 5 added with annular connection structures according to one embodiment of the present disclosure.

Reference is made to FIGS. 5 and 6, the stator structure 100 also includes an insulating annular cover 140 and a plurality of annular connection structures 150. The insulating annular cover 140 shields the annular portion 112 adjacent to the stator core assembly 110 and the coil assemblies 120 so as to insulate and isolate the annular connection structures 150 and the coil assemblies 120 from each other. In one embodiment of the present disclosure, the insulating annular cover 140 has a plurality of through holes 140a, and each through hole 140a allows the first end 122a of the first flat wire 122 and the first ends 124a of the second flat wires 124 to pass through and protrude out. In one embodiment of the present disclosure, the insulating annular cover 140 has a groove area 140b, so that the annular connection structures 150 are coaxially arranged in the groove area 140b. In one embodiment of the present disclosure, the annular connection structures 150 have a plurality of pins 150a, so as to be respectively connected to the first ends (122a, 124a) of the flat wires. The pins 150a cooperate with the annular connection structures 150 and are connected to the neutral terminals or the phase terminals by connecting plates 150b. In an embodiment of the present invention, the insulating annular cover 140 has a plurality of notches 140c, so that the plurality of connecting plates 150b of the annular connection structures 150 are respectively accommodated within and then connected to the neutral terminals or the phase terminals.

In sum, the stator structure of the vehicle motor disclosed herein has two types of flat wires have different cross-sectional thicknesses and widths and adjacent to each other in the radial direction to form a step profile, thereby enhancing coil space factor. The two types of flat wires include a first flat wire electrically connected in series to a plurality of second flat wires electrically connected in parallel to each other. The second flat wires are stacked radially adjacent to the first flat wire, and radially alternately stacked and wound around the tooth portion. The cross-sectional radial thickness sum of each of the second flat wires is greater than the cross-sectional radial thickness of the first flat wire, and the cross-sectional radial thickness sum of all the second flat wires stacked around the tooth portion is smaller than the cross-sectional radial thickness sum of the first flat wire stacked around the tooth portion. With the above-mentioned two types of flat wires, the coil space factor of the conductors can be enhanced, the stator operation loss can be reduced, and the operation efficiency of the vehicle motor stator structure can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle motor stator structure comprising:
   a stator core assembly comprising an annular portion and a plurality of tooth portions, the tooth portions extend from the annular portion in a radial direction toward a center of the stator core assembly; and
   a plurality of coil assemblies composed of flat wires, each coil assembly being configured around a corresponding tooth portion of the tooth portions, wherein each coil assembly comprises:
   a first flat wire radially stacked and wound around the corresponding tooth portion; and
   a plurality of second flat wires electrically connected in parallel to each other, the second flat wires being arranged radially adjacent to the first flat wire and electrically connected in series to the first flat wire, the second flat wires are alternately stacked and radially wound around the corresponding tooth portion.

2. The vehicle motor stator structure of claim 1, wherein a sum of a cross-sectional area of each of the second flat wires is equal to or substantially equal to a cross-sectional area of the first flat wire.

3. The vehicle motor stator structure of claim 1, wherein the second flat wires have respective cross-sectional areas that
   are equal to or substantially equal to each other; or
   are different form each other; or
   have integer ratio relationships to each other or nearly integer ratio relationships to each other.

4. The vehicle motor stator structure of claim 1, wherein the second flat wires are stacked farther from the annular portion than the first flat wire.

5. The vehicle motor stator structure of claim 1, wherein a cross-sectional width of the first flat wire is greater than a cross-sectional width of each of the second flat wires.

6. The vehicle motor stator structure of claim 1, wherein a cross-sectional radial thickness sum of each set of the second flat wires is greater than a cross-sectional radial thickness of the first flat wire, and a cross-sectional radial thickness stacked sum of all the second flat wires stacked and wound around the corresponding tooth portion is smaller than a cross-sectional radial thickness stacked sum of the first flat wire stacked and wound around the corresponding tooth portion.

7. The vehicle motor stator structure of claim 1, wherein each tooth portion comprises a side surface that is perpendicularly connected to or is nearly perpendicularly connected to an inner surface of the annular portion at a root portion of the tooth portion.

8. The vehicle motor stator structure of claim 1, wherein the first flat wire comprise a first end and a second end, wherein the second flat wires include first ends and second ends electrically connected in parallel, wherein the first end of the first flat wire and the first ends of the second flat wires both protrude from which of the stator core assembly is adjacent to the annular portion.

9. The vehicle motor stator structure of claim 8, wherein each second flat wire comprises an extension portion extending from a head of the corresponding tooth portion to the first end of the second flat wire.

10. The vehicle motor stator structure of claim 8, wherein the first end of the first flat wire and the first ends of the second flat wires protrude from a first side of the stator core assembly respectively, and the stator core assembly comprises a second side opposite to the first side of the stator core assembly.

11. The vehicle motor stator structure of claim 10, wherein the second end of the first flat wire and the second ends of the second flat wires are connected to form a joint, and the joint is located at the second side of the stator core assembly.

12. The vehicle motor stator structure of claim 8, wherein the first end of the first flat wire protrudes from a first side of the corresponding tooth portion, wherein the first ends of the second flat wires protrude from a second side of the corresponding tooth portion, the first side and the second side of the corresponding tooth portion are opposite to each other.

13. A vehicle motor stator structure comprising:
a stator core assembly comprising an annular portion and a plurality of tooth portions, the tooth portions extend from the annular portion in a radial direction toward a center of the stator core assembly; and
a plurality of coil assemblies composed of flat wires, each coil assembly being configured around a corresponding tooth portion of the tooth portions, wherein each coil assembly comprises:
a first flat wire radially stacked and wound around the corresponding tooth portion; and
a plurality of second flat wires electrically connected in parallel to each other and radially wound around the corresponding tooth portion, the second flat wires being arranged radially adjacent to the first flat wire and electrically connected in series to the first flat wire,
wherein a cross-sectional radial thickness sum of each set of the second flat wires is greater than a cross-sectional radial thickness of the first flat wire, and a cross-sectional radial thickness stacked sum of all the second flat wires stacked and wound around the corresponding tooth portion is smaller than a cross-sectional radial thickness stacked sum of the first flat wire stacked and wound around the corresponding tooth portion.

14. The vehicle motor stator structure of claim 13, wherein the first flat wire and the second flat wires are radially adjacent to form a step profile, wherein a cross-sectional area sum of each of the second flat wires is equal to or substantially equal to a cross-sectional area of the first flat wire.

15. The vehicle motor stator structure of claim 13, wherein the second flat wires have respective cross-sectional areas that
are equal to or substantially equal to each other; or
are different form each other; or
have integer ratio relationships to each other or nearly integer ratio relationships to each other.

16. The vehicle motor stator structure of claim 13, wherein the first flat wire comprise a first end and a second end, wherein the second flat wires include first ends and second ends electrically connected in parallel, wherein the first end of the first flat wire and the first ends of the second flat wires both protrude from which of the stator core assembly is adjacent to the annular portion.

17. The vehicle motor stator structure of claim 16, wherein each second flat wire comprises an extension portion extending from a head of the corresponding tooth portion to the first end of the second flat wire.

18. The vehicle motor stator structure of claim 16, wherein the first end of the first flat wire and the first ends of the second flat wires protrude from a first side of the stator core assembly respectively, and the stator core assembly comprises a second side opposite to the first side of the stator core assembly, the second end of the first flat wire and the second ends of the second flat wires are connected to form a joint, and the joint is located at the second side of the stator core assembly.

19. The vehicle motor stator structure of claim 18, further comprises an insulating annular cover shielding the annular portion adjacent to the stator core assembly, the insulating annular cover has a plurality of through holes for the first end of the first flat wire and the first ends of the second flat wires to be protruded through.

20. The vehicle motor stator structure of claim 19, further comprises a plurality of annular connection structures coaxially arranged over the insulating annular cover, and each annular connection structure is configured to connect the first end of the first flat wire or the first ends of the second flat wires of at least one of the coil assemblies.

* * * * *